(12) United States Patent
Hansen et al.

(10) Patent No.: US 12,387,321 B2
(45) Date of Patent: Aug. 12, 2025

(54) MEDICAL IMAGE ANALYSIS SYSTEM AND METHOD FOR MANAGING MEDICAL IMAGES

(71) Applicant: VISIOPHARM A/S, Hørsholm (DK)

(72) Inventors: Johan Doré Hansen, Naerum (DK); Michael Grunkin, Skodsborg (DK)

(73) Assignee: VISIOPHARM A/S, Hørsholm (DK)

( * ) Notice: Subject to any disclaimer, the term of this patent is extended or adjusted under 35 U.S.C. 154(b) by 384 days.

(21) Appl. No.: 17/908,763

(22) PCT Filed: Mar. 5, 2021

(86) PCT No.: PCT/EP2021/055577
§ 371 (c)(1),
(2) Date: Sep. 1, 2022

(87) PCT Pub. No.: WO2021/176050
PCT Pub. Date: Sep. 10, 2021

(65) Prior Publication Data
US 2023/0122073 A1   Apr. 20, 2023

(30) Foreign Application Priority Data
Mar. 5, 2020   (EP) ..................................... 20161111

(51) Int. Cl.
*G06T 7/00*   (2017.01)
*G06V 20/69*   (2022.01)

(52) U.S. Cl.
CPC .......... *G06T 7/0012* (2013.01); *G06V 20/695* (2022.01); *G06T 2207/10* (2013.01)

(58) Field of Classification Search
CPC ............... G06T 7/0012; G06T 2207/10; G06T 2207/10056; G06V 20/695
See application file for complete search history.

(56) References Cited

U.S. PATENT DOCUMENTS

2006/0010013 A1\* 1/2006 Yamatake ............... H04L 67/12
  707/E17.02
2006/0167945 A1\* 7/2006 Trautner ................ G16H 30/20
(Continued)

FOREIGN PATENT DOCUMENTS

WO   2018149787 A1   8/2018

OTHER PUBLICATIONS

Aeffner, F. et al., Introduction to Digital Image Analysis in Whole-slide Imaging: A White Paper from the Digital Pathology Association, Journal of Pathology Informatics vol. 10, No. 1, Mar. 8, 2019, p. 9.

(Continued)

*Primary Examiner* — Santiago Garcia
(74) *Attorney, Agent, or Firm* — DINSMORE & SHOHL LLP

(57) ABSTRACT

A medical image analysis system includes an image receiving/storing unit to receive/store digital images from a slide scanner; an image analysis unit to perform automatic analysis related to tumor cell detection, biomarker quantification and/or pattern recognition, and return analyzed images and/or analysis results; an image evaluation unit with an operation platform and user interface for review of images/analyzed images; an assembly/unification unit having a first interface to the analysis unit, the assembly/unification unit transferring the images to the analysis unit and receiving analyzed images and/or analysis results; a second interface to the evaluation unit, the assembly/unification unit transferring the images/analyzed images and receiving evaluations; a picture archiving/communication system or vendor neutral archive interface, the assembly/unification unit assembling and exporting the images/analyzed images/evaluations to the archiving/communication system or neutral archive.

16 Claims, 5 Drawing Sheets

(56) References Cited

U.S. PATENT DOCUMENTS

| | | | | |
|---|---|---|---|---|
| 2007/0291303 | A1* | 12/2007 | Tanaka | H04N 1/00244 |
| | | | | 358/1.15 |
| 2011/0055148 | A1* | 3/2011 | Berg | G16H 30/20 |
| | | | | 707/E17.02 |
| 2012/0154431 | A1* | 6/2012 | Fram | G06F 3/038 |
| | | | | 345/619 |
| 2016/0057343 | A1* | 2/2016 | Duan | G06T 3/4076 |
| | | | | 348/77 |
| 2017/0178320 | A1* | 6/2017 | Saalbach | G06T 7/0012 |
| 2017/0303865 | A1* | 10/2017 | Kojima | A61B 5/742 |
| 2018/0239867 | A1* | 8/2018 | Kopylov | G06V 10/44 |
| 2020/0111208 | A1* | 4/2020 | Yoshida | A61B 5/055 |

OTHER PUBLICATIONS

Cooper, L.A.D. et al: "Digital Pathology: Data-Intensive Frontier in Medical Imaging", Proceedings of the IEEE, IEEE. New York, US, vol. 100, No. 4, Apr. 1, 2012, pp. 991-1003.

Kanakatte, A. et al: "Cloud solution for histopathological image analysis using region of interest based compression", 2017 39th Annual International Conference of the IEEE Engineering in Medicine and Biology Society (EMBC), IEEE, Jul. 11, 2017, pp. 1202-1205.

* cited by examiner

MEDICAL IMAGE ANALYSIS SYSTEM AND METHOD FOR MANAGING MEDICAL IMAGES

CROSS-REFERENCE TO RELATED APPLICATIONS

This application is the U.S. National Stage of PCT/EP2021/055577 filed on Mar. 5, 2021, which claims priority to European Patent Application 20161111.8 filed on Mar. 5, 2020, the entire content of both are incorporated herein by reference in their entirety.

FIELD OF THE INVENTION

The present disclosure relates to a medical image analysis system for handling of images, in particular histopathological images. The medical image analysis system may be applied in a computational pathology workflow.

BACKGROUND OF THE INVENTION

Histopathology image analysis is a standard for cancer recognition and diagnosis. To visualize different components of the tissue, tissue sections are dyed with one or more stains. Analysis of images, including automatic analysis and analysis using artificial intelligence (AI), can be used for diagnostic and research purposes.

As digital imaging becomes increasingly important, diagnostic imaging technology evolves and computer and scanning technology becomes more powerful, the need for efficient systems for managing digital images also increases. A picture archiving and communication system (PACS) is a medical imaging technology which provides economical storage and access to images from multiple modalities. The universal format for PACS image storage and transfer is DICOM (Digital Imaging and Communications in Medicine). PACS systems are typically used in hospitals and labs to store, archive, retrieve, search, and manage images used for clinical and research purposes. Typically, a PACS consists of a multitude of devices. Images are usually gathered from a scanner and passed to the archive for storage. A central storage device stores images. Images can later be accessed from workstations through a gateway. A Vendor Neutral Archive (VNA) is a medical imaging technology in which images are stored (archived) in a standard format with a standard interface, such that they can be accessed in a vendor-neutral manner by other systems.

While PACS and VNA offer convenient storage and backup capabilities, the integration with modern pathology workflows may be a challenge in existing systems. A pathology workflow may be a complex process. An image acquisition process may involve steps such as biopsy, registration, sectioning staining and pre-assessment. In the diagnostics process, the stained slides are then scanned, stored in the PACS or VNA, which can finally be accessed from workstations through a gateway.

SUMMARY OF THE INVENTION

The present disclosure relates to a medical image analysis system comprising:
an image receiving and storing unit configured to receive and store digital images from a slide scanner;
an image analysis unit configured to perform automatic analysis of the digital images related to tumor cell detection, biomarker quantification and/or pattern recognition, and return analyzed digital images and/or an analysis result;
an image evaluation unit comprising an operation platform and user interface for review of the stored digital images and/or analyzed digital images;
an assembly and unification unit comprising:
a. a first interface to the image analysis unit, wherein the assembly and unification unit is configured to transfer the digital images to the image analysis unit and receive the analyzed digital images and/or the analysis result;
b. a second interface to the image evaluation unit, wherein the assembly and unification unit is configured to transfer the digital images and/or the analyzed digital images and receive evaluations of the digital images and/or analyzed digital images;
c. a picture archiving and communication system (PACS) or vendor neutral archive (VNA) interface, wherein the assembly and unification unit is configured to assemble and export the digital images and/or the analyzed digital images and/or the evaluations of the analyzed images to a picture archiving and communication system or vendor neutral archive,
i. wherein the image analysis unit is configured to access the stored digital images and the image evaluation unit is configured to access the stored digital images and/or analyzed digital images without access of the picture archiving and communication system.

The presently disclosed medical image analysis system may thereby provide a system which is integrated with the image analysis and image evaluation. Preferably, the image analysis unit and/or image evaluation unit is/are seamlessly integrated with a laboratory information system (LIS). ⬚ Seamlessly integrate⬚ refers to the image analysis unit and/or image evaluation unit being an integral part of the LIS from a user perspective, i.e. a user of the LIS can easily, for example, annotate an image in the image evaluation unit. In one embodiment, the digital images are stored temporarily in a database before being exported to the picture archiving and communication system or vendor neutral archive and deleted when the digital images and/or the analyzed digital images and/or the evaluations of the analyzed images have been exported to the picture archiving and communication system or vendor neutral archive. The terms picture archiving and communication system (PACS) or vendor neutral archive (VNA) as used within the present disclosure shall be interpreted as any suitable system capable of persistent storage solution in medical imaging. The storage solutions may include business continuity and disaster recovery. The temporary storing may be located in the image receiving and storing unit. It may be an advantage to test quality parameters as early as possible in the flow. The image receiving and storing unit may be configured to perform an initial test of a parameter indicative of the quality of the digital images. A parameter of the quality of the digital images shall be broadly interpreted as any calculated value, measurement or index that can give an indication of a the quality of the images obtained from the slide scanner. If the quality does not meet a given criteria, the digital image can be rejected. Typically an indication or message will then go back to the entity or person handling the preparation of the digital image, i.e. staining, scanning etc. The assembly and unification unit may be configured to perform scheduling of tasks carried out by the image analysis unit and image evaluation unit, as well as export of digital images and/or the analyzed digital images and/or the evaluations of the analyzed images to the picture archiving and communication system or vendor neutral archive. The temporary storing layer can, combined with a predefined or flexible workflow, which involves the image analysis unit, the image evaluation unit and the picture archiving and communication system or vendor neutral archive provide an efficient medical image analysis system in terms of data availability and processing speed. The temporary storing layer may be active for each incoming image for one or several days, such as 1-21 days, 1-14 days or 1-7 days. The medical image analysis system may be referred to as a catch and release system. The medical image analysis system, in this regard, may add several layers of validation for ensuring that the slides that are assembled and later exported to the PACS are technically acceptable.

More specifically, the assembly and unification unit may be configured to perform the steps of transferring the digital images to the image analysis unit and receiving the analyzed digital images; transferring the digital images and/or the analyzed digital images and receiving evaluations of the digital images and/or analyzed digital images; and assembling and exporting the digital images and/or the analyzed digital images and/or the evaluations of the analyzed images in a sequence.

The image analysis unit may be configured to perform, for example, pattern recognition and/or analysis of double stained tissues and/or hot-spot detection and/or rare event detection. The analysis may comprise quantitative analysis and may be carried out by a centralized service provider. The image analysis unit may be further configured to carry out an analysis protocol package (APP), wherein the analysis protocol package has a verified and/or validated performance Tasks carried out by the centralized service providers are conventionally fetched from a PACS or VNA. In the presently disclosed medical image analysis system, the temporarily storing digital images from a slide scanner can be sent through the first interface to the image analysis unit.

The image evaluation unit may comprise a workflow for integrating the digital images and/or the analyzed digital images into an evaluation in research, diagnostics or analysis. In such a process, a pathologist may be involved to provide manual input to the digital images and/or the analyzed digital images to provide the evaluations of the digital images and/or analyzed digital images, preferably in the form of annotated digital images.

The present disclosure further relates to a method for managing medical images. The method may be carried out on any embodiment of the presently disclosed medical image analysis system and comprises the steps of:
  receiving and temporarily storing digital images from a slide scanner;
  communicating the digital images to an image analysis unit, wherein an automatic analysis, such as analysis of stained tissue, tumor cell detection, biomarker quantification and pattern recognition of the digital images, is performed; and receiving analyzed digital images and/or one or more analysis results;
  communicating the digital images and/or the analyzed digital images to an image evaluation unit, wherein the digital images and/or the analyzed images are evaluated; and receiving evaluations of the digital images;
  assembling and exporting the digital images and/or the analyzed digital images and/or the evaluations of the digital images and/or analyzed images to a picture archiving and communication system or vendor neutral archive.

The method may, in a first step, store the digital images from the slide scanner temporarily in a database and export the digital images to the picture archiving and communication system or vendor neutral archive. The digital may then be transferred to the image analysis unit in a second step.

The present disclosure further relates a system comprising a plurality of medical image analysis systems, each system comprising:
  an image receiving and storing unit configured to receive and store digital images from a slide scanner;
  an assembly and unification unit comprising:
  a. a first interface to an image analysis unit, wherein the assembly and unification unit is configured to transfer the digital images to the image analysis unit and receive analyzed digital images through the first interface and/or the analysis result;
  b. optionally, a second interface to an image evaluation unit, wherein the assembly and unification unit is configured to transfer the digital images and/or the analyzed digital images and receive evaluations of the digital images and/or analyzed digital images through the second interface;
  c. a picture archiving and communication system interface, wherein the assembly and unification unit is configured to assemble and export the digital images and/or the analyzed digital images and/or the evaluations of the analyzed images to a picture archiving and communication system (PACS) through the third interface;
    an image evaluation unit comprising an operation platform and user interface for review of the digital images and/or the analyzed digital images,
    wherien all of the medical image analysis systems are connected to a centralized analysis laboratory. The centralized analysis laboratory may comprise a single image analysis unit, which serves as image analysis unit for all of the medical image analysis systems. The centralized analysis laboratory may be a Clinical Laboratory Improvement Amendments (CLIA) certified laboratory.

BRIEF DESCRIPTION OF THE DRAWINGS

The invention will in the following be described with reference to the accompanying drawings. The drawings are exemplary and are intended to illustrate some of the features of the presently disclosed medical image analysis system and method for managing medical images, and are not to be construed as limiting to the presently disclosed invention.

DETAILED DESCRIPTION OF THE INVENTION

Figure 1:
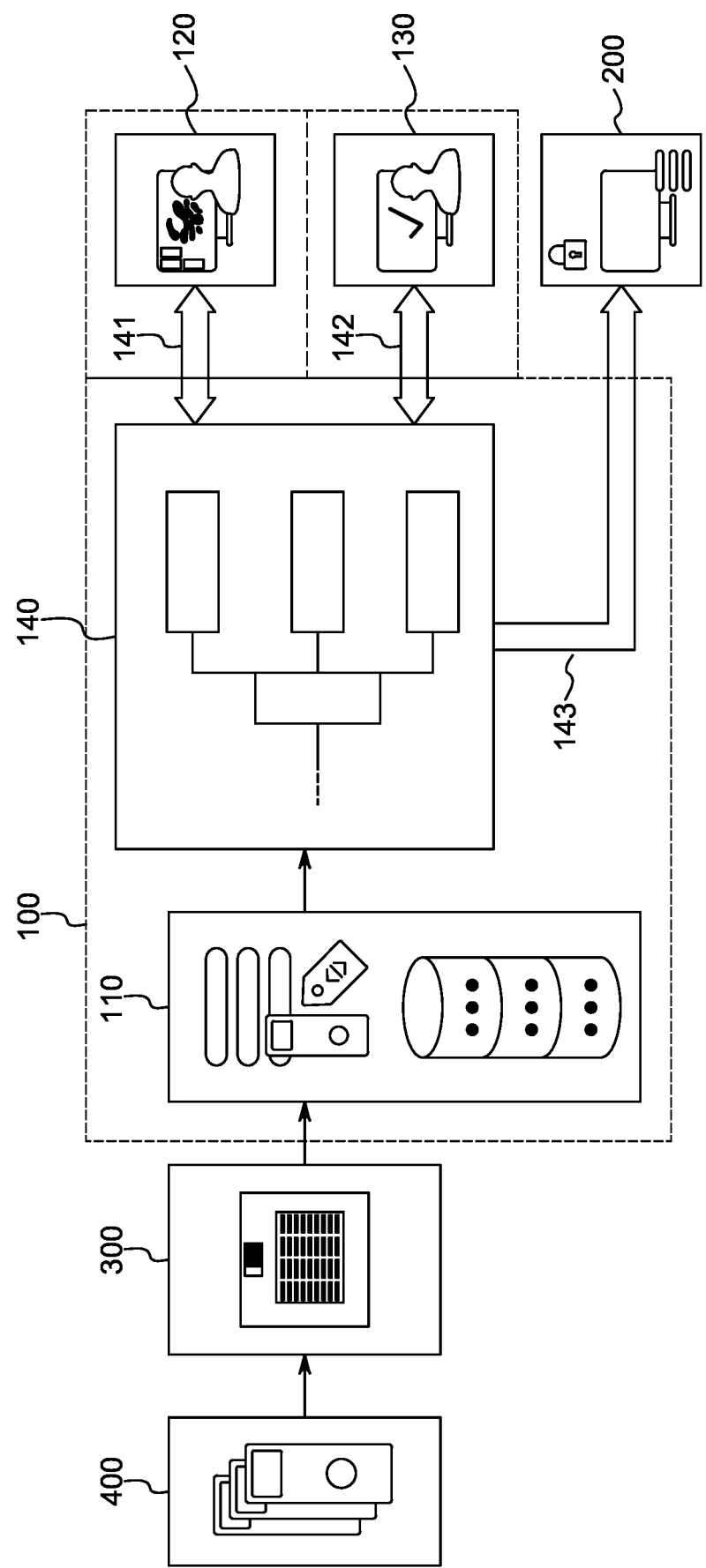
FIG. 1 shows a schematic view of an embodiment of the presently disclosed medical image analysis system.

The present disclosure relates to a medical image analysis system. The system comprises an image receiving and storing unit configured to receive and store digital images from a slide scanner. The step of receiving and storing digital images from a slide scanner shall be construed broadly in the sense that also scanners providing parts of images or tiles, which are compiled to complete slide images, are covered. The system further comprises an assembly and broker unit. The assembly and unification unit preferably comprises a first interface to an image analysis unit, wherein the assembly and unification unit is configured to transfer the digital images to the image analysis unit and receive analyzed digital images through the first interface. The assembly and unification unit may further comprise a second interface to an image evaluation unit, wherein the assembly and unification unit is configured to transfer the digital images and/or the analyzed digital images and receive evaluations of the digital images and/or analyzed digital images through the second interface. In particular, the second interface may be used after the assembly and unification unit has received digital images that have been analyzed in the image analysis unit. The assembly and unification unit may further comprise a picture archiving and communication system interface or vendor neutral archive, wherein the assembly and unification unit is configured to assemble and export the digital images and/or the analyzed digital images and/or the evaluations of the analyzed images to a picture archiving and communication system or vendor neutral archive through the third interface. The image analysis system may further comprise an image evaluation unit comprising an operation platform and user interface for review of the digital images and/or the analyzed digital images. The image analysis system may further comprise a digital slide scanner for providing the digital images from tissue slides.

A PACS broker is a gateway for communication between a hospital information system or laboratory information system. The format for PACS image storage and transfer is DICOM. Thus, the assembly and unification unit of the presently disclosed medical image analysis system may comprise a picture archiving and communication system interface or a vendor neutral archive interface. The assembly and unification unit may be further configured to assemble cases and digital images. This may include assembling individual images to groups of digital images associated with, for example, a specific patent and/or a specific study. The assembly and unification unit may, accordingly, be further configured to assemble records comprising the digital images and further information associated with the digital images. The groups of digital images may comprise images from several scanning devices and/or from several tissue sections. The digital images and/or the analyzed digital images and/or the evaluations of the analyzed images may be communicated in the medical image analysis system in a digital imaging and communications in medicine (DICOM) format. The assembly and unification unit may be configured to transform the digital images to a digital imaging and communications in medicine (DICOM) format. Unification according to the present disclosure may thereby be seen as the step of converting digital images to a predetermined format, such as DICOM. Specifically, images may be exported to the picture archiving and communication system or vendor neutral archive in the DICOM format.

A further task of the assembly and unification unit may be to act as a scheduler. In one embodiment of the presently disclosed medical image analysis system, the assembly and unification unit is configured to schedule the reception of digital images from the slide scanner, the storage of the digital images, the communication of the digital images to and from the image analysis unit, the communication of the analyzed images to/and from the image evaluation unit, and the export of the evaluations of the analyzed images to a picture archiving and communication system. The steps of transferring the digital images to the image analysis unit and receiving the analyzed digital images; transferring the digital images and/or the analyzed digital images and receiving evaluations of the digital images and/or analyzed digital images; and assembling and exporting the digital images and/or the analyzed digital images and/or the evaluations of the analyzed images may be performed in a sequence controlled by the assembly and unification unit. The evaluations may typically comprise the digital images themselves and comments, marks and/or other information related to the images provided by a pathologist.

The system may be configured to store the digital images from the slide scanner temporarily in a database and to export the digital images the picture archiving and communication system or vendor neutral archive in a first step, and further configured to to transfer the digital images to the image analysis unit in a second step.

FIG. 1 shows a schematic view of an embodiment of the presently disclosed medical image analysis system (100). The medical image analysis system (100) comprises an image receiving and storing unit (110) configured to receive and store digital images from a slide scanner (300). The medical image analysis system (100) further comprises an assembly and unification unit (140) comprising a first interface (141) to an image analysis unit (120), a second interface (142) to an image evaluation unit (130), and a picture archiving and communication system interface (143) to a picture archiving and communication system (200). The image receiving and storing unit may be configured to perform an initial test of a parameter indicative of the quality of the digital images. The initial test may be performed on the stored digital images from the slide scanner. If the quality does not meet a given criteria, the digital image can be rejected. Typically an indication or message will then go back to the entity or person handling the preparation of the digital image, i.e. staining, scanning etc. The test of the parameter indicative of the quality of the digital images may comprise an assessment of a staining quality parameter, and/or a slide quality parameter, and/or a fixation quality parameter, and/or an image focus parameter, and/or an artefact and/or a parameter having a negative impact on a diagnosis based on the digital images. In one embodiment the image receiving and storing unit is configured to reject the digital images if at least one staining quality parameter, and/or the slide quality parameter, and/or the fixation quality parameter, and/or the image focus parameter, and/or the artefact and/or a parameter having a negative impact on a diagnosis based on the digital images is outside a predetermined quality measure or quality score range. Prior to digitizing the section using the slide scanner (300), tissue sections may be transferred to microscopic glass slides and stained, which is illustrated by slide preparation (400). Each of the image receiving and storing unit (110), the image analysis unit (120), the image evaluation unit (130) and the assembly and unification unit (140) may comprises one or several processing units and/or memory for carrying out the processes described in the present disclosure.

The digital images may be histopathological images, such as histopathological images of tissue stained according to a hematoxylin and eosin (H&E) staining protocol. ‖Tissue ‖ within the scope of the present disclosure, may come from any relevant tissue, and will typically come from tumor tissue or tissue suspected to contain tumor tissue. It may be any tumor, such as typically tumor tissue selected from breast tumor tissue, colon tumor tissue, bladder tumor tissue, kidney tumor tissue, endometrial tumor tissue, lung tumor tissue, melanoma tissue, and prostate tumor.

The staining may be any staining used in laboratories for staining specimens containing cells, such as tissue sections or fluid specimens.

The image analysis unit referred to in the present disclosure may be a process implemented on a computer or a processing unit and a computer program having instructions, which, when executed by the processing unit may cause the processing unit to perform the method. The image analysis unit may be configured to carry out a quantitative analysis. The quantitative analysis may processing task related to, for example, automatic identification and outlining of regions of interest, segmentation, detection, displaying heat maps, hotspots, biomarker quantification, pattern recognition, analysis of double stained tissues, rare event detection etc. The process may be semi-automatic or fully automatic and may typically not require the involvement of a pathologist. The processing may use a deep learning model that has been trained to perform the task. In one embodiment the image analysis unit is configured to carry out an analysis protocol package (APP). Preferably, the analysis protocol package has a verified and/or validated performance and can therefore run automatically and independently. Since analysis protocol packages may require compliance with regulatory requirements and/or quality system requirements, it may be an advantage to use a separate entity for handling the quantitative analysis. Therefore, several medical image analysis systems may share an image analysis unit.

The image evaluation unit referred to in the present disclosure may comprise a workflow for integrating the digital images and/or the analyzed digital images into an evaluation in research, diagnostics or analysis. The image evaluation unit may comprise an interface that can be used by a pathologist to provide manual input to the digital images and/or the analyzed digital images to provide the evaluations of the digital images and/or analyzed digital images, preferably in the form of annotated digital images. An image evaluation according to the present disclosure may be a process implemented on a computer or a processing unit and a computer program having instructions, which, when executed by the processing unit may cause the processing unit to perform the method. A pathologist is able to conclude on the analyzed digital images from the image analysis unit and may be responsible for reporting for each case. Accordingly, in one embodiment of the presently disclosed medical image analysis system a pathologist provides manual input to the digital images and/or the analyzed digital images to provide the evaluations of the digital images and/or analyzed digital images, preferably in the form of annotated digital images. The evaluations of the digital images and/or analyzed digital images may comprise pathology reports describing histological findings of a pathologist.

In the embodiment wherein the medical image analysis system comprises an image analysis unit and an image evaluation unit, the first interface and the second interface may be a shared interface. The image analysis unit and image analysis unit may be part of a shared platform.

The medical image analysis system may comprise an interface to a centralized laboratory. The present disclosure further relates to a plurality of medical image analysis systems, wherein each medical image analysis system comprises:

an image receiving and storing unit configured to receive and store digital images from a slide scanner;
an assembly and unification unit comprising:
a. a first interface to an image analysis unit, wherein the assembly and unification unit is configured to transfer the digital images to the image analysis unit and receive analyzed digital images through the first interface;
b. a second interface to an image evaluation unit, wherein the assembly and unification unit is configured to transfer the digital images and/or the analyzed digital images and receive evaluations of the digital images and/or analyzed digital images through the second interface;
c. a picture archiving and communication system interface, wherein the assembly and unification unit is configured to assemble and export the digital images and/or the analyzed digital images and/or the evaluations of the analyzed images to a picture archiving and communication system (PACS) through the third interface;
an image evaluation unit comprising an operation platform and user interface for review of the digital images and/or the analyzed digital images.

The plurality of medical image analysis systems may be arranged in a network, wherein all of the medical image analysis systems are connected to a centralized analysis laboratory, preferably the same centralized analysis laboratory. The centralized analysis laboratory may, specifically, be a Clinical Laboratory Improvement Amendments (CLIA) certified laboratory. The centralized analysis laboratory may comprise any embodiment of the presently disclosed image analysis unit. Accordingly, the assembly and unification unit of each medical image analysis system may be configured to communicate through the first interface with the image analysis unit of the centralized analysis laboratory.

Figure 2:
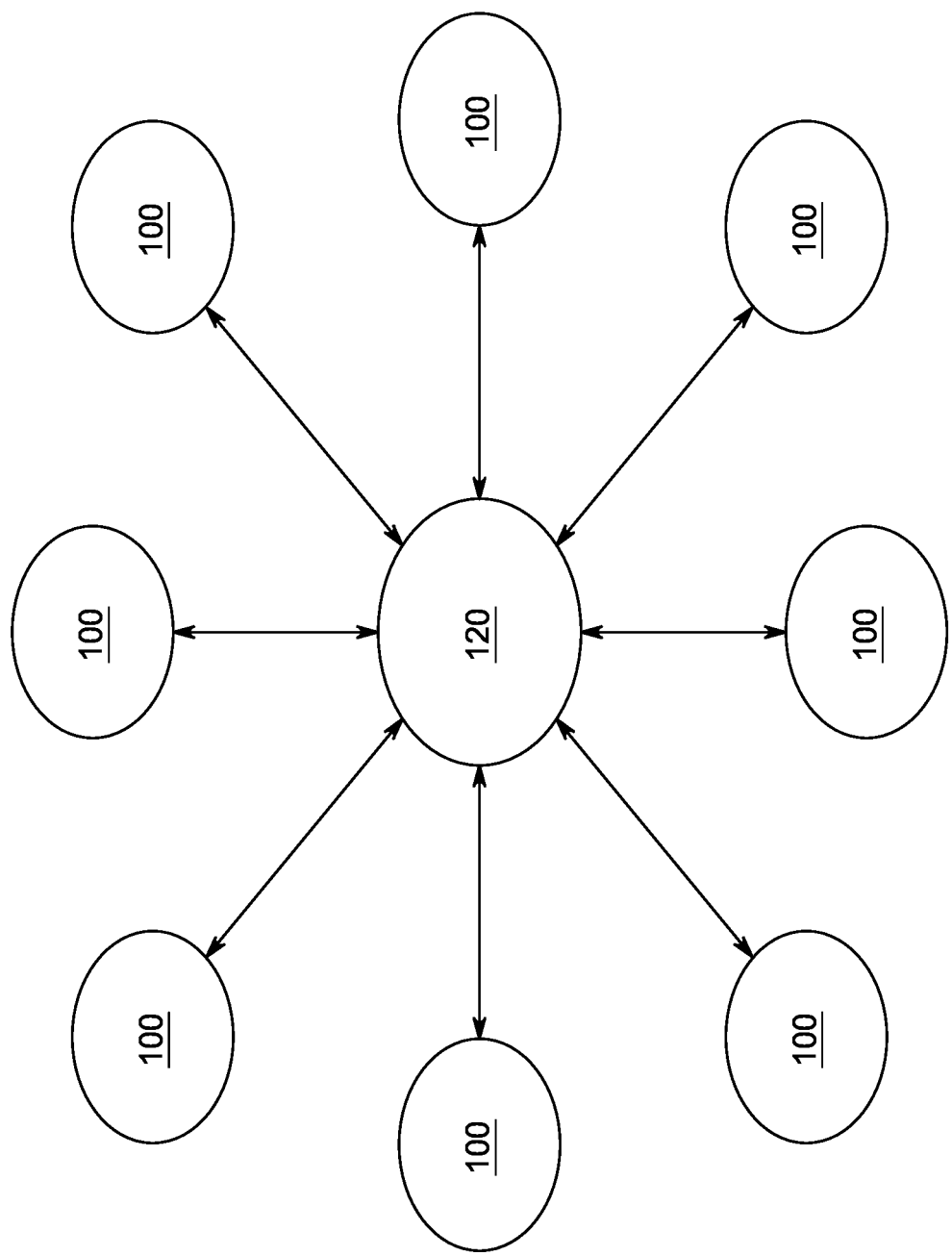
FIG. 2 shows a schematic view of an embodiment of the presently disclosed system comprising a plurality of medical image analysis systems sharing an image analysis unit of a centralized analysis laboratory.

FIG. 2 shows a schematic view of an embodiment of a system comprising a plurality of medical image analysis systems (100) sharing an image analysis unit (120) of a centralized analysis laboratory.

The present disclosure further relates to a method for managing medical images and/or a method for analyzing, evaluating and archiving medical images. The method may be carried out on any embodiment of the presently disclosed medical image analysis system and comprises the steps of:
receiving and temporarily storing digital images from a slide scanner;
communicating the digital images to an image analysis unit, wherein an automatic analysis, such as analysis of stained tissue, tumor cell detection, biomarker quantification and pattern recognition of the digital images, is performed; and receiving analyzed digital images;
communicating the analyzed digital images to an image evaluation unit, wherein the analyzed images are evaluated; and receiving evaluations of the digital images;
assembling and exporting the digital images and/or the analyzed digital images and/or the evaluations of the analyzed images to a picture archiving and communication system.

The method introduces independent and integrated analysis of digital images from a slide scanner in the sense that when the slides have been scanned, the step of storing the images in the picture archiving and communication system is initially excluded. Instead the digital images are temporarily stored in a local database from which they can be assembled and transferred to an image analysis unit and an image evaluation unit before they are stored in the picture archiving and communication system. However, the method may also, in a first step, store the digital images from the slide scanner temporarily in a database and export the digital images to the picture archiving and communication system or vendor neutral archive. In this way the digital images are stored in a permanent storage solution but also maintained in a temporary database, from which image analysis and image evaluation can be performed.

Preferably, the image analysis unit and/or image evaluation unit is/are seamlessly integrated with a laboratory information system (LIS). The laboratory information system does not have to request and fetch images from the picture archiving and communication system.

Figure 3:
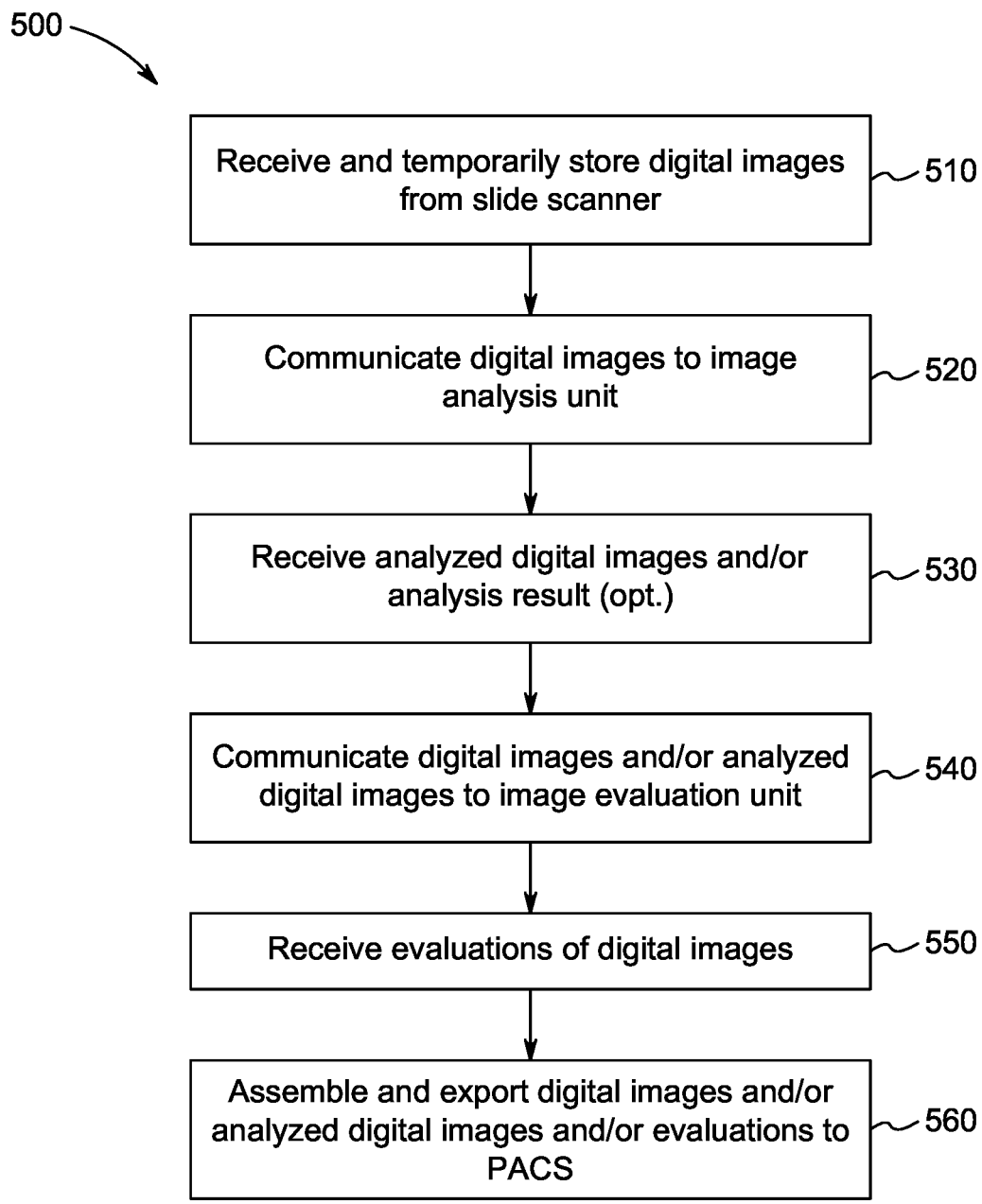
FIGS. 3-5 show flow charts of methods according to embodiments of the presently disclosed method for managing medical images.
Figure 4:
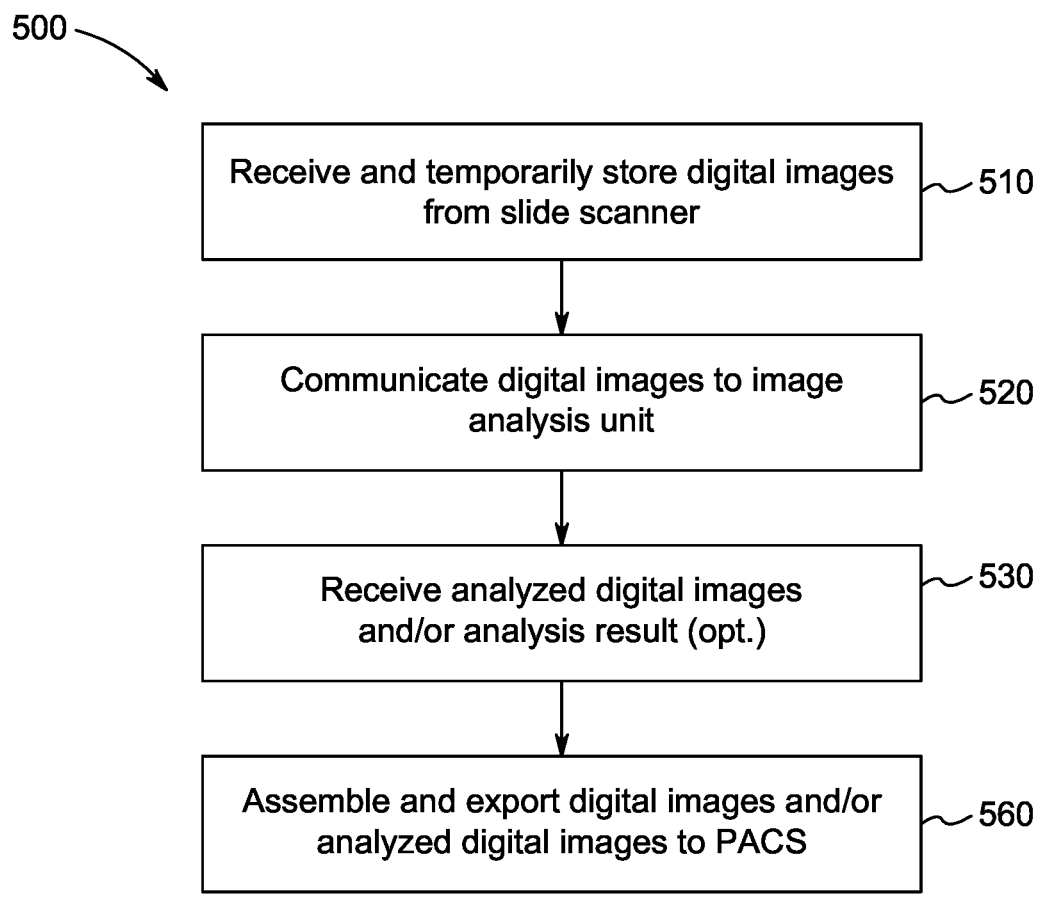
Figure 5:
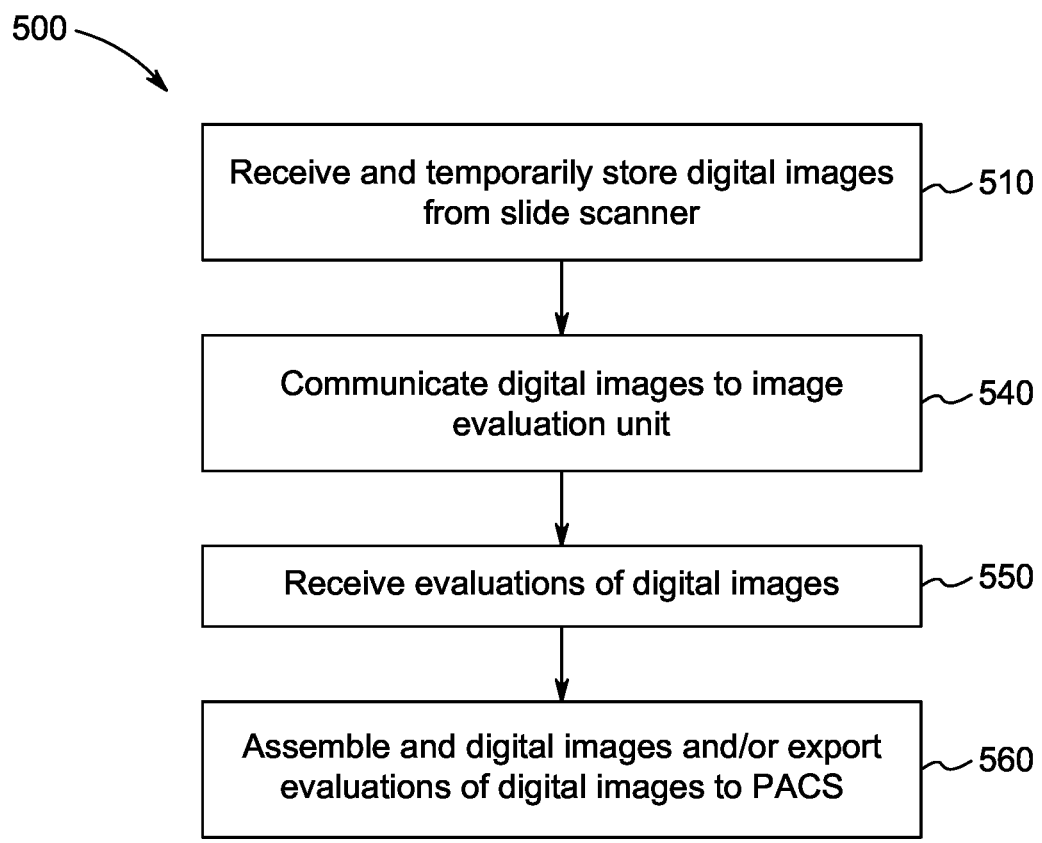

FIG. 3 shows a flow chart of a method according to embodiments of the presently disclosed method for managing medical images (500). The method comprises: receiving and temporarily storing digital images from a slide scanner (510); communicating the digital images to an image analysis unit (520), wherein an automatic analysis is performed; and receiving analyzed digital images and/or one or more analysis results (530); communicating the digital images and/or the analyzed digital images to an image evaluation unit (540), wherein the analyzed images are evaluated; and receiving evaluations of the digital images (550); and assembling and exporting the digital images and/or the analyzed digital images and/or the evaluations of the analyzed images to a picture archiving and communication system (560).

The invention further relates to a computer program having instructions which when executed by a computing device or computing system cause the computing device or system to carry out any embodiment of the presently disclosed method for managing medical images. Computer program in this context shall be construed broadly and include, for example, programs to be run on a PC or software adapted to run as a part of a laboratory information system.

Further Details

1. A medical image analysis system comprising:
   an image receiving and storing unit configured to receive and store digital images from a slide scanner;
   an image analysis unit configured to perform automatic analysis of the digital images, such as analysis related to tumor cell detection, biomarker quantification and/or pattern recognition, and return analyzed digital images and/or an analysis result;
   optionally, an image evaluation unit comprising an operation platform and user interface for review of the digital images and/or analyzed digital images;
   an assembly and unification unit comprising:
      a first interface to the image analysis unit, wherein the assembly and unification unit is configured to transfer the digital images to the image analysis unit and receive the analyzed digital images and/or the analysis result;
      optionally, a second interface to the image evaluation unit, wherein the assembly and unification unit is configured to transfer the digital images and/or the analyzed digital images and receive evaluations of the digital images and/or analyzed digital images;
      a picture archiving and communication system or vendor neutral archive interface, wherein the assembly and unification unit is configured to assemble and export the digital images and/or the analyzed digital images and/or the evaluations of the analyzed images to a picture archiving and communication system (PACS) or vendor neutral archive.

2. The medical image analysis system according to item 1, wherein the digital images are histopathological images, such as histopathological images of tissue stained according to a hematoxylin and eosin (H&E) staining protocol.

3. The medical image analysis system according to any one of the preceding items, wherein the image receiving and storing unit is configured to store the digital images temporarily.

4. The medical image analysis system according to any one of the preceding items, wherein the image receiving and storing unit is configured to perform an initial test of a parameter indicative of the quality of the digital images.

5. The medical image analysis system according to item 4, wherein the initial test comprises an assessment of a staining quality parameter, and/or a slide quality parameter, and/or a fixation quality parameter, and/or an image focus parameter, and/or an artefact parameter and/or a parameter having a negative impact on a diagnosis based on the digital images.

6. The medical image analysis system according to item 5, wherein medical image analysis system is configured to reject the digital images if at least one staining quality parameter, and/or the slide quality parameter, and/or the fixation quality parameter, and/or the image focus parameter, and/or the artefact is outside a predetermined quality measure or quality score range.

7. The medical image analysis system according to any one of the preceding items, wherein the digital images are stored temporarily in a database and deleted when the digital images and/or the analyzed digital images and/or the evaluations of the analyzed images have been exported to the picture archiving and communication system.

8. The medical image analysis system according to any one of the preceding items, wherein assembly and unification unit is configured to transform the digital images to a digital imaging and communications in medicine (DICOM) format.

9. The medical image analysis system according to any one of the preceding items, wherein the digital images and/or the analyzed digital images and/or the evaluations of the analyzed images are exported to the picture archiving and communication system in the digital imaging and communications in medicine (DICOM) format.

10. The medical image analysis system according to any one of the preceding items, wherein the assembly and unification unit is configured to perform the steps of transferring the digital images to the image analysis unit and receiving the analyzed digital images and/or the analysis result; transferring the digital images and/or the analyzed digital images and receiving evaluations of the digital images and/or analyzed digital images; and assembling and exporting the digital images and/or the analyzed digital images and/or the evaluations of the analyzed images in a sequence.

11. The medical image analysis system according to any one of the preceding items, further comprising a digital slide scanner for providing the digital images from tissue slides.

12. The medical image analysis system according to any one of the preceding items, wherein the automatic analysis of the digital images comprises analysis of stained tissue and/or tumor cell detection and/or biomarker quantification and/or pattern recognition.

13. The medical image analysis system according to any one of the preceding items, wherein the image analysis unit is configured to perform pattern recognition and/or analysis of double stained tissues and/or hot-spot detection and/or rare event detection.

14. The medical image analysis system according to any one of the preceding items, wherein the image evaluation unit comprises a workflow for integrating the digital images and/or the analyzed digital images into an evaluation in research, diagnostics or analysis.

15. The medical image analysis system according to item 14, wherein a pathologist provides manual input to the digital images and/or the analyzed digital images to provide the evaluations of the digital images and/or analyzed digital images, preferably in the form of annotated digital images.

16. The medical image analysis system according to any one of the preceding items, wherein the evaluations of the digital images and/or analyzed digital images comprise pathology reports describing histological findings of a pathologist.

17. The medical image analysis system according to any one of the preceding items, wherein the first interface and the second interface are a shared interface, and wherein image analysis unit and image analysis unit are a shared platform.

18. The medical image analysis system according to any one of the preceding items, further configured to assemble records comprising the digital images and further information associated with the digital images.

19. The medical image analysis system according to any one of the preceding items, wherein the image analysis unit and/or image evaluation unit is/are seamlessly integrated with a laboratory information system (LIS).

20. The medical image analysis system according to any one of the preceding items, wherein the first interface is an interface to a centralized laboratory.

21. A medical image analysis system comprising:
   an image receiving and storing unit configured to receive and store digital images from a slide scanner;
   an assembly and unification unit comprising:
      a first interface to an image analysis unit, wherein the assembly and unification unit is configured to transfer the digital images to the image analysis unit and receive analyzed digital images and/or an analysis result through the first interface;
      optionally, a second interface to an image evaluation unit, wherein the assembly and unification unit is configured to transfer the digital images and/or the analyzed digital images and receive evaluations of the digital images and/or analyzed digital images through the second interface;
      a picture archiving and communication system or vendor neutral archive interface, wherein the assembly and unification unit is configured to assemble and export the digital images and/or the analyzed digital images and/or the evaluations of the analyzed images to a picture archiving and communication system (PACS) or vendor neutral archive through the third interface;
   optionally, an image evaluation unit comprising an operation platform and user interface for review of the digital images and/or the analyzed digital images.

22. A plurality of medical image analysis systems according to item 21, arranged in a network, wherein all of the medical image analysis systems are connected to a centralized analysis laboratory.

23. The plurality of medical image analysis systems according to item 22, wherein the centralized analysis laboratory is a Clinical Laboratory Improvement Amendments (CLIA) certified laboratory.

24. The plurality of medical image analysis systems according to any one of items 22-23, wherein the centralized analysis laboratory comprises an image analysis unit.

25. The plurality of medical image analysis systems according to item 24, wherein the assembly and unification unit of each medical image analysis system is configured to communicate through the first interface with the image analysis unit of the centralized analysis laboratory.

26. A method for managing medical images comprising:
   receiving and temporarily storing digital images from a slide scanner;
   communicating the digital images to an image analysis unit, wherein an automatic analysis is performed; and receiving analyzed digital images and/or one or more analysis results;
   communicating the digital images and/or the analyzed digital images to an image evaluation unit, wherein the digital images and/or the analyzed images are evaluated; and receiving evaluations of the digital images; and
   assembling and exporting the digital images and/or the analyzed digital images and/or the evaluations of the digital images and/or analyzed images to a picture archiving and communication system or vendor neutral archive.

The invention claimed is:

1. A medical image analysis system comprising:
   an image receiving and storing unit configured to receive and store digital images from a slide scanner;
   an image analysis unit configured to perform automatic analysis of the digital images related to tumor cell detection, biomarker quantification and/or pattern recognition, and return analyzed digital images and/or an analysis result;
   an image evaluation unit comprising an operation platform and user interface for review of the stored digital images and/or analyzed digital images;
   an assembly and unification unit comprising:
      a first interface to the image analysis unit, wherein the assembly and unification unit is configured to transfer the digital images to the image analysis unit and receive the analyzed digital images and/or the analysis result;
      a second interface to the image evaluation unit, wherein the assembly and unification unit is configured to transfer the digital images and/or the analyzed digital images and receive evaluations of the digital images and/or analyzed digital images;
      a picture archiving and communication system (PACS) or vendor neutral archive (VNA) interface, wherein the assembly and unification unit is configured to assemble and export the digital images and/or the analyzed digital images and/or the evaluations of the analyzed images to a picture archiving and communication system or a vendor neutral archive (VNA),
   wherein the image analysis unit is configured to access the stored digital images and the image evaluation unit is configured to access the stored digital images and/or analyzed digital images without access of the picture archiving and communication system or vendor neutral archive.

2. The medical image analysis system according to claim 1, wherein the digital images are histopathological images, such as histopathological images of tissue stained according to a hematoxylin and eosin (H&E) staining protocol.

3. The medical image analysis system according to claim 1, wherein the image receiving and storing unit is configured to perform an initial test of a parameter indicative of the quality of the digital images.

4. The medical image analysis system according to claim 3, wherein the initial test comprises an assessment of a staining quality parameter, and/or a slide quality parameter, and/or a fixation quality parameter, and/or an image focus parameter, and/or an artefact parameter and/or a parameter having a negative impact on a diagnosis based on the digital images.

5. The medical image analysis system according to claim 4, wherein the medical image analysis system is configured to reject the digital images if at least one staining quality parameter, and/or the slide quality parameter, and/or the fixation quality parameter, and/or the image focus parameter, and/or the artefact is outside a predetermined quality measure or quality score range.

6. The medical image analysis system according to claim 1, wherein the digital images from the slide scanner are stored temporarily in a database before being exported to the picture archiving and communication system or vendor neutral archive and deleted when the digital images and/or the analyzed digital images and/or the evaluations of the analyzed images have been exported to the picture archiving and communication system or vendor neutral archive.

7. The medical image analysis system according to claim 1, wherein the system is configured to store the digital images from the slide scanner temporarily in a database and to export the digital images the picture archiving and communication system or vendor neutral archive in a first step, and wherein the system is configured to to transfer the digital images to the image analysis unit in a second step.

8. The medical image analysis system according to claim 1, wherein the assembly and unification unit is configured to perform the steps of transferring the digital images to the image analysis unit and receiving the analyzed digital images and/or the analysis result; transferring the digital images and/or the analyzed digital images and receiving evaluations of the digital images and/or analyzed digital images; and assembling and exporting the digital images and/or the analyzed digital images and/or the evaluations of the analyzed images in a sequence.

9. The medical image analysis system according to claim 1, wherein the image analysis unit is configured to perform pattern recognition and/or analysis of double stained tissues and/or hot-spot detection and/or rare event detection.

10. The medical image analysis system according to claim 1, wherein the image evaluation unit comprises an interface for integrating the digital images and/or the analyzed digital images into an evaluation in research, diagnostics or analysis, wherein a pathologist provides manual input to the digital images and/or the analyzed digital images through the interface to provide the evaluations of the digital images and/or analyzed digital imagesin the form of annotated digital images.

11. The medical image analysis system according to claim 1, wherein the image analysis unit and/or image evaluation unit is/are integrated in a laboratory information system (LIS).

12. A medical image analysis system comprising:
an image receiving and storing unit configured to receive and store digital images from a slide scanner;
an assembly and unification unit comprising:
  a first interface to an image analysis unit, wherein the assembly and unification unit is configured to transfer the digital images to the image analysis unit and receive analyzed digital images and/or an analysis result through the first interface;
  a second interface to an image evaluation unit, wherein the assembly and unification unit is configured to transfer the digital images and/or the analyzed digital images and receive evaluations of the digital images and/or analyzed digital images through the second interface;
  a picture archiving and communication system or vendor neutral archive (VNA) interface, wherein the assembly and unification unit is configured to assemble and export the digital images and/or the analyzed digital images and/or the evaluations of the analyzed images to a picture archiving and communication system or a vendor neutral archive through the third interface;
wherein the assembly and unification unit is configured to transfer the digital images to the image analysis unit and receive analyzed digital images and/or an analysis result through the first interface and the assembly and unification unit is configured to transfer the digital images and/or the analyzed digital images and receive evaluations of the digital images and/or analyzed digital images through the second interface without access of the picture archiving and communication system or vendor neutral archive.

13. A plurality of medical image analysis systems according to claim 12, arranged in a network, further comprising an image evaluation unit comprising an operation platform and user interface for review of the digital images and/or the analyzed digital images.

14. A plurality of medical image analysis systems according to claim 12, arranged in a network, wherein all of the medical image analysis systems are connected to a centralized analysis laboratory through the first interface of each medical image analysis system.

15. The plurality of medical image analysis systems according to claim 12, wherein the centralized analysis laboratory comprises an image analysis unit, wherein the assembly and unification unit of each medical image analysis system is configured to communicate through the first interface with the image analysis unit of the centralized analysis laboratory.

16. A method for managing medical images comprising:
providing a medical image analysis system comprising:
  an image receiving and storing unit configured to receive and store digital images from a slide scanner; and
  an assembly and unification unit comprising:
    a first interface to an image analysis unit, wherein the assembly and unification unit is configured to transfer the digital images to the image analysis unit and receive analyzed digital images and/or an analysis result through the first interface;
    a second interface to an image evaluation unit, wherein the assembly and unification unit is configured to transfer the digital images and/or the analyzed digital images and receive evaluations of the digital images and/or analyzed digital images through the second interface; and
    a picture archiving and communication system or vendor neutral archive interface, wherein the assembly and unification unit is configured to assemble and export the digital images and/or the analyzed digital images and/or the evaluations of the analyzed images to a picture archiving and communication system or vendor neutral archive through the third interface;
  wherein the assembly and unification unit is configured to transfer the digital images to the image analysis unit and receive analyzed digital images and/or an analysis result through the first interface and the assembly and unification unit is configured to transfer the digital images and/or the analyzed digital images and receive evaluations of the digital images and/or analyzed digital images through the second interface without access of the picture archiving and communication system or vendor neutral archive;
receiving and temporarily storing the digital images from the slide scanner;
communicating the digital images to the image analysis unit without accessing the picture archiving and communication system or vendor neutral archive, wherein an automatic analysis is performed; and receiving the analyzed digital images and/or the analysis results;

communicating the digital images and/or the analyzed digital images to the image evaluation unit without accessing the picture archiving and communication system or vendor neutral archive, wherein the digital images and/or the analyzed images are evaluated; and receiving evaluations of the digital images; and assembling and exporting the digital images and/or the analyzed digital images and/or the evaluations of the digital images and/or analyzed images to the picture archiving and communication system or vendor neutral archive.

\* \* \* \* \*